Nov. 12, 1968  D. J. MAZUROV ET AL  3,410,542

PLANT FOR CALCINING BINDING AND REFRACTORY MATERIALS

Filed June 15, 1965

United States Patent Office 3,410,542
Patented Nov. 12, 1968

3,410,542
PLANT FOR CALCINING BINDING AND REFRACTORY MATERIALS
Dmitry Jakovlevich Mazurov, Gennady Vladimirovich Zakharov, Jury Efimovich Malkin, Ivan Petrovich Chernyshov, Boris Gavrilovich Lexin, Viktor Terentjevich Seliverstov, and Alexandr Alexandrovich Nikitin, Kraskovo, and Dmitry Nickolaevich Potanin, Moscow, U.S.S.R., assignors to Gosudarstvenny Vsesojuzny Nauchno-Issledovatelsky Institut Stroitelnykh Materialoi i Konstruktsy, Moskow, U.S.S.R.
Filed June 15, 1965, Ser. No. 464,128
3 Claims. (Cl. 263—21)

ABSTRACT OF THE DISCLOSURE

The present plant for calcining binding and refractory materials in a suspended condition and more particularly lime, chamotte and magnesite includes a whirler-type furnace, a source of a mixture of raw materials, heater means for the preliminary heat treatment of the mixture. The mixture following the preliminary heat treatment is transmitted from the heater into the furnace. A crystallizer-cooler is located between the furnace and the heater and such crystallizer-cooler is defined by a jacket, a channel of heat resisting material mounted within and spaced from the inner periphery of the jacket communicating with the furnace and heater respectively. Air is supplied to the space between the jacket and the channel for cooling the channel. Means are further provided for supplying preheated air and fuel to the furnace for providing the high temperature stage of calcining, after which the dust-laden gaseous stream enters the channel wherein the cooling effect of the air in the space between the jacket and the channel effects the desired crystalline structure of the calcine product.

---

The present invention relates to a plant for calcining binding and refractory materials in a suspended condition, namely materials, such as lime, cement, magnesite, chamotte, etc.

Plants for calcining binding and refractory materials known in the art include shaft and rotating furnaces, and various apparatus adapted to perform separate calcining operations in a suspended condition, such as for instance, for heating raw materials and cooling clinkers.

The disadvantages of the known shaft and rotary furnaces are the long time necessary for operation, low efficiency (per unit of volume), and the relatively large sizes of calcined lump material which require considerable power consumption for grinding. Some of the existing apparatus do not allow the whole process of calcining in suspended condition by high-speed methods to be effected.

It is a principal object of the present invention to provide a complex plant to perform all the calcining operations in a suspended condition (with high-speed methods) with a high output (per unit of volume).

It is a further object of the present invention to reduce the number of devices comprising the plant set, and in particular to eliminate the cooling machine as a separate unit for cooling the calcined materials.

It is a still further object of the present invention to increase the productive capacity of the plant with a relatively small consumption of fuel.

It is yet another object of the invention to improve the quality of the calcined product, provide a fine-grained structure for the product, and utilize a minimum of electric power for the grinding thereof.

According to the present invention, the plant comprises a whirler-type furnace (calcining stage), a heat-utilizing apparatus (preparatory stages) and dust catchers, which include the following parts:

(a) a coiled-pipe pneumatic preheater or a cyclone cascade for the preliminary heat treatment of raw materials;

(b) a high-temperature radiation and convection heater for preheating air; and (c) a double-stage dust catching set comprising mechanical dust catchers (in the first stage) and cloth or electric filters (in the second stage) for catching calcined products.

Depending on specific requirements, the whirler furnace may be positioned horizontally or vertically.

The present plant, according to the design thereof is a universal installation, because, without any radical changes, it can be employed for calcining various binding and refractory materials. Changes may be made only in the proportions of the calculated ratios of heating surfaces, temperature conditions of calcining, sorts of fuel and metal, as well as refractory and heat-insulating materials selected for the construction of the plant.

Figure 1:
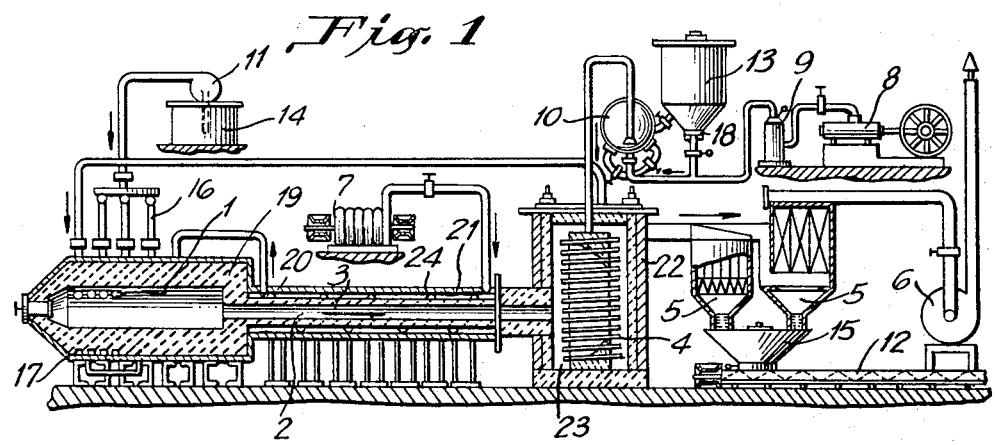
Figure 2:
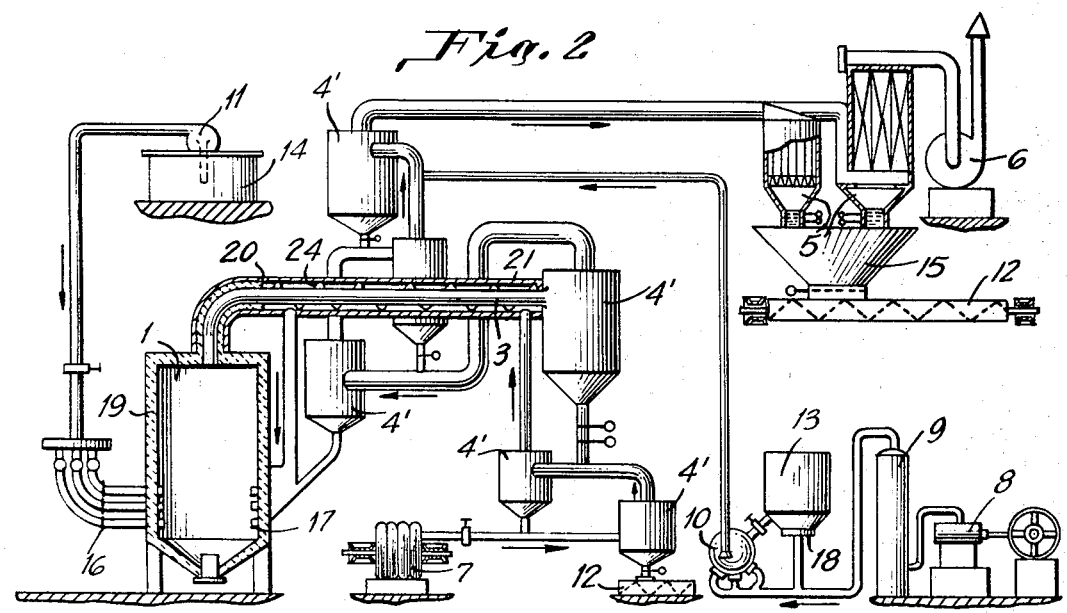

Further objects and advantages of the present invention will become more fully apparent from a consideration of the following description of a preferred embodiment, taken in conjunction with the accompanying drawings, in which:

FIG. 1 is a diagrammatic view showing a plant for the calcining in a suspended condition of binding and refractory materials, in which the heater of raw materials is in the form of a coiled pipe heater; and FIG. 2 is a diagramatic view showing the calcining plant in which the heater of raw materials is in the form of a cascade of cyclones.

The plant comprises the following main units namely a whirler-type furnace 1, a crystallizer 2 for cooling the calcined product, an air heater 3, a coiled pipe pneumatic heater 4 (FIG. 1) or a cascade of cyclones 4' (FIG. 2), and dust catchers 5.

In the capacity of blast-draft and handling equipment are used a smoke exhauster 6, an air blower 7, a compressor 8 provided with a receiver 9, a pneumatic pump 10, in case the liquid fuel is used a fuel pump 11 (being excluded when the gaseous fuel is utilized), and a conveyor 12 for the calcined product. The plant is also provided with a hopper 13 for the raw materials, a tank 14 for the liquid fuel being used (excluded in case of the gaseous fuel), and a bunker 15 for the calcined product.

Burners 16 and air-supply regulators 17 are provided for the whirler-type furnace. The hopper 13 is provided with a device 18 for supplying the raw materials by means of compressed air into the pneumatic pump 10.

The main materials used for the construction of the proposed plant are a highly refractory lining 19 for the furnace 1, heat-resisting steel for housing 20 of the crystallizer or cooler 2 and the coiled-pipe pneumatic heater 4 (FIG. 1), heat insulation 21 withstanding temperatures up to 500° C., and a lining 22 of ordinary refractory materials of the chamotte type for chamber 23 of the coiled-pipe pneumatic heater 4 (FIG. 1), as well as for internal lining of the cyclones 4' (FIG. 2).

The rest of the units and parts of the plant are to be manufactured from the ordinary steel. The proposed calcining plant operates as follows: In FIGS. 1 and 2 the direction of movement of materials is shown by the arrow *a*; gases by the arrow *b*; air by the arrow *c*; and fuel by the arrow *d*. The mixture of raw materials is continuously delivered from the hopper 13 into the chamber of the pneumatic pump 10. By means of the pneumatic pump 10 a given quantity of the raw-material mixture is continuously fed by compressed air emanating from the receiver 9 into the coiled-pipe pneumatic heater 4 (FIG. 1) or into the upper section of the cascade of cyclones 4' (FIG. 2). The preparatory operations of the calcining process are effected either in the coiled-pipe pneumatic heater 4 (FIG. 1) or in the cascade of cyclones 4' (FIG. 2).

After the preliminary heat treatment in the coiled-pipe pneumatic heater 4 (FIG. 1) or in the cascade of cyclones 4' (FIG. 2) the material is supplied into the whirler-type furnace 1, wherein the high-temperature stage of calcining is performed. The preheated air and fuel are supplied into the furnace 1 through the regulators 17 and burners 16, respectively. In the furnace, there is produced a vortex or spiral-shaped gas stream in which the fuel burns intensively. The material to be calcined is vigorously mixed with gases due to the forces of inertia of the whirling stream, thus being rapidly raised to the preset temperature of calcining.

From the furnace 1, the dust-laden gaseous stream is carried into the straight narrow channel 2, referred to as a crystallizer-cooler for the calcined product. Here, due to a sharp cooling of the channel walls by air, the desired crystalline structure of the calcined product is obtained. Thereafter, the dust-laden gaseous stream proceeds into the chamber 23 of the coiled-pipe pneumatic heater 4 (FIG. 1), where the stream twists and passes upward along the spiral (to the outlet), thereby heating intensively the coil from the outside. Thus, the arrangement of the plant (FIG. 1) relates to systems with divided streams of heat-carriers. In case the cascade of cyclones 4' is used (FIG. 2), this heat system of the plant relates to systems with intermixing streams of heat carriers. In this case, to prevent intermixing of the finished product with the heated raw materials in the cascade of cyclones 4' (FIG. 2), the calcined product is separated from the gaseous stream in the lower part of the cascade of cyclones 4' (FIG. 2) connected with the crystallizer-cooler 2. The raw materials are not supplied into such section.

As a result of heat utilization (heating of air and raw-materials mixture), the gaseous stream carrying the products of calcining is cooled to a required temperature, and then, in the first case (FIG. 1), undergoes the double-stage operation of dust-cleaning. The collected product of calcining is accumulated in a hopper 15 from which it is delivered to the conveyer 12. By means of the smoke exhauster 6, dust-free gases are delivered to the atmosphere. In the second case (FIG 2), the product of calcining collected in the lower part of the cascade of cyclones 4' undergoes the operation of double-stage air cooling in the lower cooling sections of the cascade of cyclones.

The air used for fuel burning according to the first embodiment (FIG. 1) is forced by the air blower 7 into the heater 3, arranged around the crystallizer-cooler 2 of the calcined product, and the air heater 3 is provided with a spiral 24 to impart a vertical motion to the stream in order to intensify the heat exchange. In case the second embodiment (FIG. 2) is used, the air is heated twice namely, in the lower sections of the cascade of cyclones 4', and then in the heater 3.

The invention is not to be confined to any strict conformity to the showings in the drawings but changes or modifications may be made therein so long as such changes or modifications mark no material departure from the spirit and scope of the appended claims.

What is claimed is:

1. A plant for calcining binding and refractory material in a suspended condition and particularly lime, chamotte and magnesite, comprising a whirler-type furnace, a source of a mixture of raw materials, a heater for the preliminary heat treatment of such mixture, means for supplying the mixture from the source to the heater, a crystallizer-cooler located between the furnace and the heater, said crystallizer-cooler including a jacket, a channel of heat resisting material mounted within and spaced from the inner periphery of the jacket communicating with the furnace and the heater respectively, means for supplying air to the space between the jacket and the channel, means for introducing the mixture from the heater into the furnace, and means for supplying preheated air and fuel to the furnace for providing the high temperature stage of calcining and after which the dust-laden gaseous stream enters the channel wherein the cooling effect of the air in the space between the jacket and the channel effects the desired crystalline structure of the calcine product.

2. The plant for calcining binding and refractory materials in a suspended condition as claimed in claim 1 in which said heater is defined by a pneumatic coiled pipe heat exchanger.

3. The plant for calcining binding and refractory materials in a suspended condition as claimed in claim 1 in which said heater is defined by a cascade of inter-connected cyclones.

References Cited

UNITED STATES PATENTS

| 2,762,619 | 9/1956 | Booth | 263—21 |
| 2,782,018 | 2/1957 | Bradford | 263—21 |
| 3,145,019 | 7/1964 | Clute | 263—21 |
| 3,235,239 | 2/1966 | Petersen | 263—32 |

JOHN J. CAMBY, *Acting Primary Examiner.*

D. A. TAMBURRO, *Assistant Examiner.*